Dec. 18, 1951  V. L. JACKSON ET AL  2,578,887
AUTOMATIC FISHING DEVICE
Filed Aug. 22, 1947
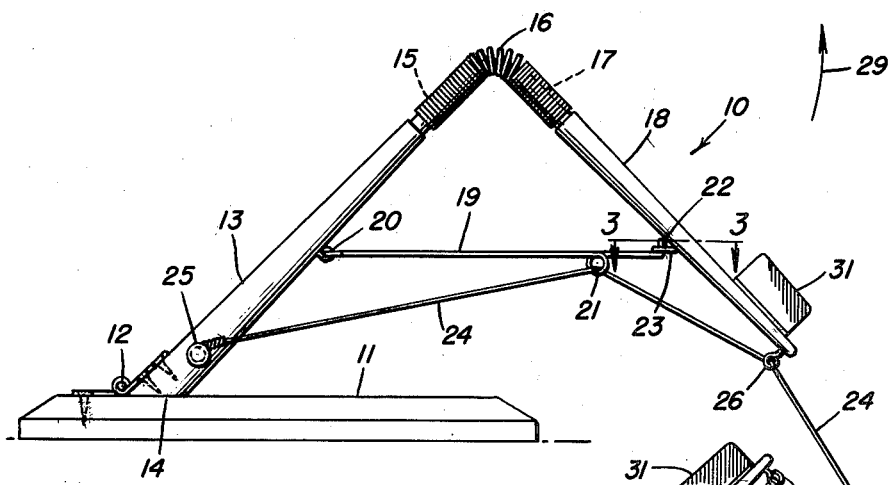
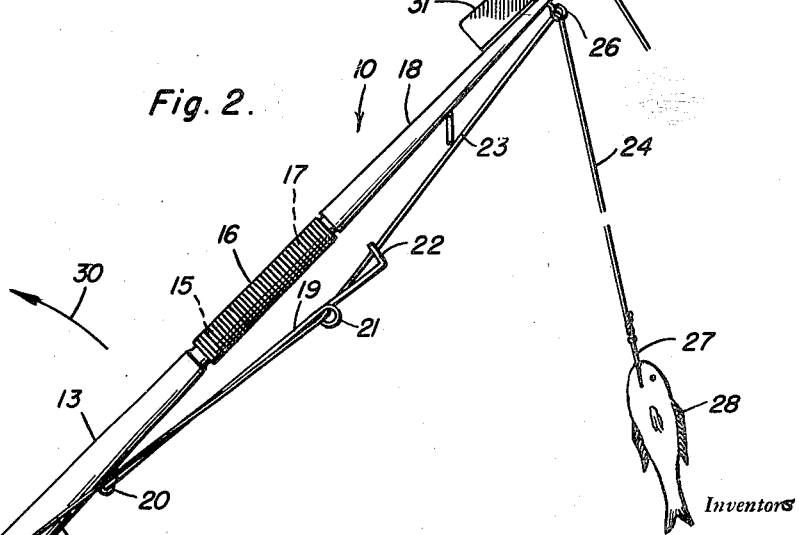
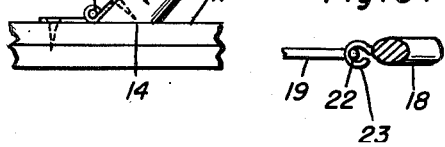
Inventors
Vesper Jackson
Wilson Pfrehm
Stanley R. Danekas
By *Clarence A. O'Brien and Harvey B. Jackson*
Attorneys Patented Dec. 18, 1951

2,578,887

UNITED STATES PATENT OFFICE 2,578,887

AUTOMATIC FISHING DEVICE

Vesper L. Jackson, Wilson H. Pfrehm, and Stanley R. Danekas, Thedford, Nebr.; said Danekas assignor to said Jackson and said Pfrehm Application August 22, 1947, Serial No. 770,038

3 Claims. (Cl. 43—15)

This invention relates to new and useful improvements and structural refinements in automatic fishing devices, and the principal object of the invention is to provide a device of the character herein described, which may be pre-set or pre-adjusted in the manner of a trap, so that the fish may be pulled out of the water, or at least, so that the fish hook may be caused to imbed itself into the mouth of the fish, as soon as the fish bites or tugs upon the fishing line.

A further object of the invention is to provide a fishing device of the character described which is fully automatic in operation, so that several devices of this nature may be under supervision of one fisherman at one time.

Another object of the invention is to provide a fishing device which is simple in construction, which will not easily become damaged and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevational view of the invention, showing the same in the pre-set position.

Figure 2 is a side elevational view, similar to that shown in Figure 1, but illustrating the invention after the fish has been caught, and Figure 3 is a cross-sectional detail, taken substantially in the plane of the line 3—3 in Figure 1.

Like characters of reference are employed to designate like parts in the specification and throughout the several views.

Referring now to the accompanying drawings in detail, the invention consists of an automatic fishing device designated generally by the reference character 10, the same embodying in its construction a suitable base plate 11 to which is secured a hinge 12 which, in turn, supports what will hereinafter be referred to as a rod base section 13.

This base section is provided at one end thereof with an obliquely cut end surface 14 which is engageable with the upper surface of the base 11 in such manner that the rod section 13 is normally supported in a slanting position, substantially as shown in the accompanying drawings.

It will be also noted that the rod base section 13 is tapered toward its outer extremity 15 which functions in the manner of an adaptor on which one end portion of a resilient element, namely, a coil spring 16 is rigidly mounted.

The remaining end portion of the spring 16 is similarly mounted upon a further adaptor 17 formed at the relatively large end of a tapered rod outer section 18, the spring 16 normally urging the rod sections 13, 18 into longitudinal alignment, as is best shown in Figure 2.

If desired, the adaptors 15, 17 may be formed with a helical groove (not shown) in which the end portions of the spring 16 may be firmly seated.

Trigger means assuming the form of a wire rod 19 are associated with the base section 13, this being accomplished by movably attaching one end of the rod 19 to an eye 20 provided medially the length of the base section 13. The rod 19 is arcuated medially of its length so as to provide a coil, loop or eye 21, and the remaining end-portion of the rod terminates in a hook 22.

This hook is releasably engageable with a detent assuming the form of an eye 23 secured medially the length of the outer section 18, so that when the hook engages the last mentioned eye, the rod sections 13, 18 are disposed in a substantially V-shaped formation (as shown in Figure 1), against the resiliency of the spring 16.

A suitable fishing line 24 is secured at one end thereof, as at 25, to the rod base section 13, the line 24 passing first through the eye 21 and then through a further eye 26 provided at the outer end of the rod section 18. The free end portion of the line 24 carries the usual fish hook 27, as will be clearly apparent.

Accordingly, when the invention is placed in use, the device is pre-set by forcing the rod sections 13, 18 against the resiliency of the spring 16 into a V-shaped formation shown in Figure 1, whereupon the hook 22 may be engaged with the eye 23, so as to retain the rod section in this particular position.

Needless to say, the outer end portion of the fishing line 24, including the fish hook 27, is then cast or thrown into the water, and as soon as a fish bites or tugs upon the line 24, the fish hook 22 will be disengaged from the detent or eye 23, and as a result, the resiliency of the spring 16 will urge the rod section 18 into longitudinal alignment with the section 13, as shown in Figure 2. In this manner, the fish 28 will be forcibly withdrawn from the water, or at least, the fish hook 27 will be caused to imbed itself into the mouth of the fish, as will be readily understood.

By observing the accompanying drawings, it will be apparent that the arrangement of the trigger rod 19, the detent 23 and the passage of the line 24 through the eye 21 is such as to facilitate the particular automatic action above set forth.

Moreover, attention is directed to the fact that when, upon disengagement of the hook 22 from the detent 23, the rod section 18 is caused to swing upwardly in the direction of the arrow 29, the inertia of the section 18 will automatically cause the rod section 13 to swing rearwardly in the direction of the arrow 30 about the hinge 12. In this manner, an instantaneous withdrawal of the fish from the water will be facilitated.

If desired, a suitable flag 31, or other indicating means may be attached to the outer end portion of the said rod section 18, for the purpose of indicating to the fisherman that a fish has been caught.

Finally, it should be explained that while in the foregoing disclosure the rod section 13 has been shown and described as being hingedly attached to the base 11, the latter may, if desired, be eliminated and the section 13 may be attached, either hingedly or rigidly to the gunwale of a boat, to the dock, or to some other suitable supporting structure.

It is believed that the advantages and use of the invention will be clearly apparent from the foregoing disclosure, and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What is claimed as new is:

1. An automatic fishing device comprising a rod base section, an outer rod section, means flexibly connecting said sections to each other and normally urging said sections into axial alignment, a trigger member having a first end thereof pivotally attached to said base section intermediate the ends of said base section, an eye carried by said outer section intermediate the ends thereof, a hook on the second end of said trigger member releasably received in said eye to retain said outer section in an angularly disposed set position relative to said base section, a line receiving loop on said trigger member intermediate the ends thereof, a line guide on the outer end of said outer section, a fishing line slidably disposed through said guide and loop, and means carried by said base section for receiving one end of said line, a tension on said line releasing said trigger member from said eye whereby said outer section swings into a position in axial alignment with said base section, said loop constituting an intermediate line guide when said rod sections are in alignment with each other.

2. An automatic fishing device comprising a rod base section, means vertically pivotally mounting said base section on a support, means limiting pivotal movement of said base section in one direction, an outer rod section, means flexibly connecting said sections to each other and normally urging said sections into axial alignment, a trigger member having a first end thereof pivotally attached to said base section intermediate the ends of said base section, an eye carried by said outer section intermediate the ends thereof, a hook on the second end of said trigger member releasably received in said eye to retain said outer section in an angularly disposed set position relative to said base section, a line receiving loop on said trigger member intermediate the ends thereof, a line guide on the outer end of said outer section, a fishing line slidably disposed through said guide and loop, and means carried by said base section for receiving one end of said line, a tension on said line releasing said trigger member from said eye whereby said outer section swings into a position in axial alignment with said base section, said loop constituting an intermediate line guide when said rod sections are in alignment with each other.

3. An automatic fishing device comprising a rod base section, means vertically pivotally mounting said base section on a support, means limiting pivotal movement of said base section in one direction, an outer rod section, means flexibly connecting said sections to each other and normally urging said sections into axial alignment, a trigger member, a swivel connection between one end of said trigger member and an intermediate portion of said base section, an eye carried by said outer section intermediate the ends thereof, an upwardly extending hook carried by the outer end of said trigger member and releasably received in said eye to retain said sections in an angularly disposed set position relative to each other, a line receiving loop on said trigger member, intermediate the ends thereof, a line guide on the outer end of said outer section, a line having a first end thereof disposed through said guide and loop, and means carried by said base section for receiving said first end of said line, a tension on the other end of said line releasing said trigger member from said eye whereby said sections are moved into axial alignment, said loop constituting an intermediate line guide when said sections are in axial alignment with each other.

VESPER L. JACKSON.
WILSON H. PFREHM.
STANLEY R. DANEKAS.

REFERENCES CITED

The following references are of record in the file of this patent:

UNITED STATES PATENTS

| Number | Name | Date |
|---|---|---|
| 476,940 | Wiss | June 14, 1892 |
| 1,523,223 | Leonardos | Jan. 13, 1925 |
| 1,549,405 | Bjurstrom | Aug. 11, 1925 |
| 2,177,912 | Spitz | Oct. 31, 1939 |
| 2,351,734 | Backe | June 20, 1944 |

FOREIGN PATENTS

| Number | Country | Date |
|---|---|---|
| 86,160 | Austria | Apr. 15, 1921 |